(12) United States Patent
Kim et al.

(10) Patent No.: US 10,599,857 B2
(45) Date of Patent: Mar. 24, 2020

(54) EXTRACTING FEATURES FOR AUTHENTICATION EVENTS

(71) Applicant: EntIT Software LLC, Sunnyvale, CA (US)

(72) Inventors: Mijung Kim, Sunnyvale, CA (US); Pratyusa K. Manadhata, Piscataway, NJ (US); Manish Marwah, Palo Alto, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 152 days.

(21) Appl. No.: 15/689,045

(22) Filed: Aug. 29, 2017

(65) Prior Publication Data
US 2019/0065762 A1  Feb. 28, 2019

(51) Int. Cl.
| | | |
|---|---|---|
| *G06F 21/60* | (2013.01) | |
| *G06F 21/31* | (2013.01) | |
| *G06F 21/35* | (2013.01) | |
| *G06F 16/00* | (2019.01) | |
| *G06F 16/35* | (2019.01) | |

(Continued)

(52) U.S. Cl.
CPC ............ *G06F 21/604* (2013.01); *G06F 16/00* (2019.01); *G06F 16/355* (2019.01); *G06F 21/31* (2013.01); *G06F 21/316* (2013.01); *G06F 21/35* (2013.01); *H04L 63/08* (2013.01); *H04L 63/102* (2013.01); *H04L 63/108* (2013.01); *G06F 13/00* (2013.01); *G06F 16/2474* (2019.01); *G06F 16/9535* (2019.01); *G06F 21/552* (2013.01);

(Continued)

(58) Field of Classification Search
CPC ...... G06F 21/604; G06F 16/00; G06F 16/355; G06F 2221/2117; G06F 3/0416; G06F 21/32; G06F 21/316; G06F 21/552; G06F 21/00; G06F 21/60; G06F 16/35; G06F 2221/21; G06F 7/08; G06F 13/00; G06F 21/35; G06F 21/56; G06F 16/2474; G06F 16/9535; G06F 11/0709; H04L 63/102; H04L 63/0428; H04L 63/10; H04L 67/26; H04L 41/069; H04L 63/108; G07G 1/0072; G06K 9/6277; G06Q 10/10

USPC ............ 726/1, 7, 23, 28; 713/168, 171, 182; 707/749; 382/305; 719/318; 714/26

See application file for complete search history.

(56) References Cited

U.S. PATENT DOCUMENTS

| | | | |
|---|---|---|---|
| 7,376,969 B1 | 5/2008 | Njemanze | |
| 8,910,188 B1 * | 12/2014 | Wang | G06F 13/00 |
| | | | 719/318 |

(Continued)

OTHER PUBLICATIONS

Features Extraction Scheme for Behavioural Biometric Authentication in Touchscreen Mobile Devices Ala Abdulhakim Alariki, Azizah Abdul Manaf, Seyed Mojtaba Mousavi Issn 0973-4562 vol. 11, No. 18 (2016) Number of pp. 14 (Year: 2016).*

(Continued)

*Primary Examiner* — Jeffrey C Pwu
*Assistant Examiner* — Ali H. Cheema

(57) ABSTRACT

In some examples, for a given authentication event between a plurality of devices in a network, a system identifies a set of events, at the devices, that are temporally related to the given authentication event. The system extracts features from the set of events by aggregating event data of the set of events. The system provides the extracted features to a classifier that detects unauthorized authentication events.

19 Claims, 7 Drawing Sheets

(51) Int. Cl.
  *H04L 29/06* (2006.01)
  *G06F 16/2458* (2019.01)
  *G06F 16/9535* (2019.01)
  *G06F 21/56* (2013.01)
  *G06F 21/55* (2013.01)
  *G06Q 10/10* (2012.01)
  *G06F 13/00* (2006.01)

(52) U.S. Cl.
  CPC ...... *G06F 21/56* (2013.01); *G06F 2221/2117* (2013.01); *G06Q 10/10* (2013.01)

(56) References Cited

U.S. PATENT DOCUMENTS

| | | | |
|---|---|---|---|
| 9,378,361 B1 | 6/2016 | Yen et al. | |
| 9,641,544 B1 | 5/2017 | Treat | |
| 9,667,641 B2 | 5/2017 | Muddu et al. | |
| 9,679,125 B2 | 6/2017 | Bailor | |
| 9,690,933 B1 | 6/2017 | Singh | |
| 9,881,179 B2 * | 1/2018 | Patton | G06F 16/9535 |
| 9,911,290 B1 * | 3/2018 | Zalewski | G07G 1/0072 |
| 9,985,984 B1 | 5/2018 | Chavez | |
| 1,028,981 A1 | 5/2019 | Stavrou | |
| 10,298,444 B2 * | 5/2019 | Bishnoi | H04L 41/069 |
| 2004/0221163 A1 * | 11/2004 | Jorgensen | H04L 63/0428 713/182 |
| 2005/0262343 A1 * | 11/2005 | Jorgensen | H04L 63/0428 713/168 |
| 2006/0112039 A1 | 5/2006 | Wang | |
| 2009/0099988 A1 | 4/2009 | Stokes | |
| 2011/0302653 A1 | 12/2011 | Frantz | |
| 2011/0320816 A1 * | 12/2011 | Yao | G06F 21/316 713/171 |
| 2012/0191630 A1 | 7/2012 | Breckenridge | |
| 2012/0290879 A1 * | 11/2012 | Shibuya | G06N 20/00 714/26 |
| 2013/0139179 A1 * | 5/2013 | Roll | G06F 11/0709 719/318 |
| 2014/0181968 A1 | 6/2014 | Ge | |
| 2014/0245439 A1 * | 8/2014 | Day | G06F 21/552 726/23 |
| 2015/0161237 A1 * | 6/2015 | Agarwal | G06Q 10/10 707/749 |
| 2016/0006730 A1 * | 1/2016 | Chari | G06F 21/32 726/7 |
| 2016/0026656 A1 * | 1/2016 | Mansour | G10L 15/183 382/305 |
| 2016/0034712 A1 * | 2/2016 | Patton | H04W 4/21 726/28 |
| 2016/0224618 A1 * | 8/2016 | Robichaud | G06F 16/00 |
| 2016/0030884 A1 | 10/2016 | Kent | |
| 2016/0308884 A1 * | 10/2016 | Kent | G06K 9/6277 |
| 2016/0308898 A1 | 10/2016 | Teeple | |
| 2016/0335425 A1 | 11/2016 | Liu | |
| 2016/0357301 A1 * | 12/2016 | Padiri | G06F 3/0416 |
| 2017/0063909 A1 | 3/2017 | Muddu | |
| 2017/0093910 A1 | 3/2017 | Gukai | |
| 2017/0272521 A1 * | 9/2017 | Takahashi | H04L 67/26 |
| 2017/0277727 A1 * | 9/2017 | Chen | G06F 21/56 |
| 2017/0351739 A1 * | 12/2017 | Zou | G06F 7/08 |
| 2018/0069893 A1 * | 3/2018 | Amit | G06F 21/00 |
| 2018/0314742 A1 * | 11/2018 | Taropa | G06F 16/2474 |
| 2019/0036971 A1 * | 1/2019 | Ford | G06F 21/552 |
| 2019/0173893 A1 | 6/2019 | Muddu | |

OTHER PUBLICATIONS

Security after Login: Identity Change Detection on Smartphones Using Sensor Fusion Tao Feng, Xi Zhao, Nick DeSalvo, Zhimin Gao, Xi Wang and Weidong Shi pp. 6, Aug. 27 (Year: 2015).*
A Keystroke Dynamics Based System for User Identification Mariusz Rybnik1, Marek Tabedzki2, Khalid Saeed1,2 pp. 6, Jul. 9, 2009 (Year: 2008).*
Differentiating User Authentication Graphs Alexander D. Kent, Lorie M. Liebrock pp. 4, Jul. 22 (Year: 2013).*
Implicit Authentication for Mobile Devices Markus Jakobsson, Elaine Shi, Philippe Golle, Richard Chow pp. 6, (Year: 2009).*
Chawla et al., SMOTE: Synthetic Minority Over-Sampling Technique published Jun. 2002 (37 pages).
Manadhata et al., U.S. Appl. No. 15/689,043 entitled Unauthorized Authentication Events filed Aug. 29, 2017 (26 pages).
Marwah et al., U.S. Appl. No. 15/689,047 entitled Training Models Based on Balanced Training Data Sets filed Aug. 29, 2017 (36 pages).
Mike Scutt, Information Security, RAPID7 Community and Blog, Introspective Intelligence: What Makes Your Network Tick, What Makes it Sick? Nov. 17, 2016 (5 pages).
Musthaler et al., Fortscale's user behavioral analytics solution provides full context when truly malicious behavior is detected, Jan. 2016 (5 pages).
RAPID7—Detecting Lateral Movement with Windows Event Logs downloaded Jul. 31, 2017 (4 pages).
RAPID7, Technical Primer, Managed Detection and Response downloaded Jul. 31, 2017 (4 pages).
Rod Soto, Dynamic Population Discovery for Lateral Movement (Using Machine Learning), https://www.slideshare.net/RodSoto2/dynamic-population-discovery-for-lateral-movement-using-machine-learning, downloaded Jul. 19, 2017 (101 pages).
Siadati et al., Detecting Malicious Logins in Enterprise Networks Using Visualization, 2016 (8 pages).
STRATA-v4 http://www.slideshare.net/RamShankarSivaKumar/strata-2015-presentation-detecting-lateral-movement, downloaded Jul. 19, 2017 (34 pages).
Vectra Networks, White Paper, Detect Insider Attacks in Real Time https://yellowcube.eu/wp-content/uploads/2017/06/wp-insider-threat-detection.pdf,2017 (6 pages).
Vectra Networks, The Data Science Behind Vectra Threat Detections— https://yellowcube.eu/wp-content/uploads/2017/06/the-data-science-behind-vectra-threat-detections.pdf, 2016 (10 pages).
Wikipedia, Gradient Boosting last edited Jul. 28, 2017 (10 pages).
Wikipedia, Random forest last edited Jul. 23, 2017 (10 pages).
Chebrolu et al.; Feature deduction and ensemble design of intrusion detection systems; 2005; Elsevier, Computers & Security 24; pp. 1-13, as printed. (Year: 2005).
U.S. Appl. No. 15/689,043, Final Rejection dated Jul. 5, 2019, pp. 1-15 and attachments.
U.S. Appl. No. 15/689,043, Non-Final Rejection dated Mar. 6, 2019, pp. 1-12 and attachments.

* cited by examiner

EXTRACTING FEATURES FOR AUTHENTICATION EVENTS

BACKGROUND

To gain access to a network, a user may use a credential such as a username and password, a certificate, a security key, and so forth. User credentials can be stolen by an unauthorized entity. For example, a user may disclose the user's credential to the unauthorized entity, which may be masquerading as a legitimate service. Alternatively, the unauthorized entity may include malware that can track a user's inputs to extract a credential entered by the user, or can access stored information to retrieve the credential.

BRIEF DESCRIPTION OF THE DRAWINGS

Some implementations of the present disclosure are described with respect to the following figures.

Figure 1:
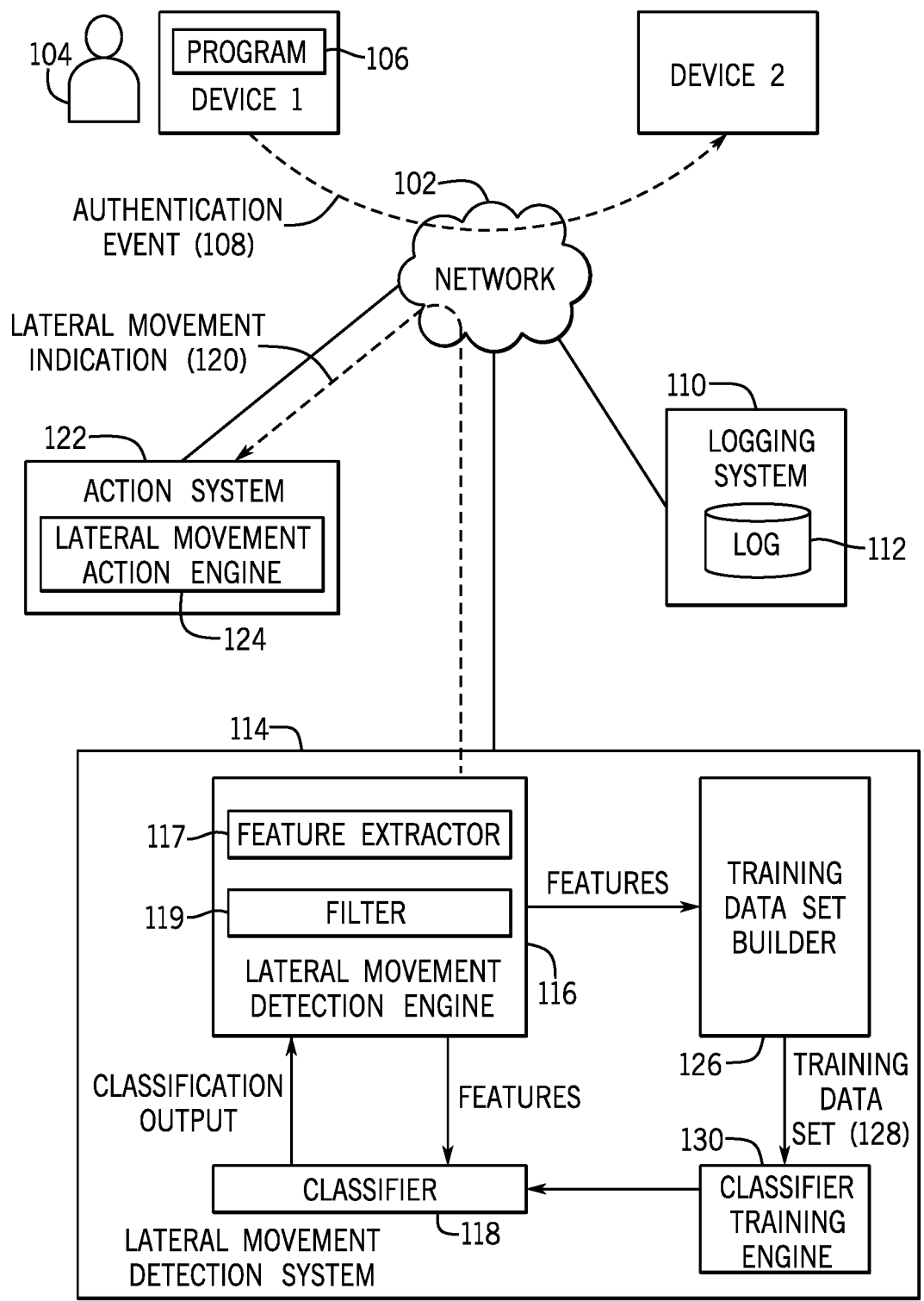
FIG. 1 is a block diagram of an arrangement that includes devices coupled over a network, and a lateral movement detection system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Once an unauthorized entity has obtained a user's credential, the unauthorized entity can move within a network. The movement of the unauthorized entity within the network using a valid credential is referred to as lateral movement. By performing lateral movement, the unauthorized entity seeks to find other vulnerable users (to obtain credentials of such other users or to obtain sensitive information belonging to such other users), vulnerable devices, and sensitive information. With lateral movement, the unauthorized entity can also access devices in the network to obtain information stored by or accessible by such devices, or to use resources of the devices. Devices in the network may store sensitive information, or can have access to information that ultimately allows the unauthorized entity to access a data repository containing sensitive information. Sensitive information can refer to financial information, technical information, or any other information that an enterprise or individual wishes to protect against disclosure to unauthorized entities (users, programs, or machines).

Because lateral movement involves the access of users or devices by an unauthorized entity based on use of a valid credential, traditional security mechanisms, such as malware detectors, may not be able to detect the unauthorized use of the credential. For example, traditional security mechanisms may not be able to distinguish between a user's authorized use of the user's own credential and an unauthorized entity's use of the same credential after stealing it In accordance with some implementations of the present disclosure, a machine-learning based approach is used to distinguish unauthorized authentication events (that use stolen or compromised credentials) from benign authentication events (which are authentication events by authorized entities). To detect unauthorized authentication events (also referred to as detecting lateral movement), a classifier can be trained using a training data set. A classifier can also be referred to as a machine-learning model. A training data set refers to collections of features (sometimes arranged as feature vectors), where each collection of features is assigned a label indicating whether or not the collection of features is indicative of an unauthorized authorization event. A positive label specifies that the collection of features is indicative of unauthorized authentication event, while a negative label specifies that the collection of features is not indicative of an unauthorized authentication event.

A "feature" can refer to any characteristic that is extracted from event data associated with an authentication event. The feature can include an attribute retrieved from the event data, or an attribute computed based on the event data. In either case, the feature is considered to be extracted from event data.

Once the classifier is trained, the classifier is applied on a collection of features (e.g., a feature vector) associated with events, where the events can include the given authentication event as well as the set of events that are temporally related to the given authentication event. A classifier applied on a collection of features can refer to any of: (1) one classifier applied on one collection of features, or (2) one classifier applied on multiple collections of features, or (3) multiple classifiers applied on one collection of features, or (4) multiple classifiers applied on multiple collections of features. The system determines, based on an output of the classifier, whether the given authentication event is an unauthorized authentication event associated with lateral movement.

An authentication event is generated when a user or program at a first device in a network attempts to log into a second device in the network by offering a user's credential to the second device. In some examples, a credential can include a combination of a username and a password, a security certificate, a security key, or any other information that can be used to determine whether the user or the program at the first device is authorized to access the second device.

In a large network, there can be a very large number of authentication events. Many authentication events are benign, with a relatively small percentage of authentication events being malicious. Examples of benign authentication events include a local authentication event at a device, such as when a user is at the device and logs into the device. In some examples of the present disclosure, filtering can be applied to authentication events to reduce the number of authentication events that are to be considered by a system for detection of unauthorized authentication events. The filtering of authentication events can be based on a specified criterion, such as by checking for a specified pattern.

For a given authentication event (identified after the filtering) between multiple devices in a network, a system according to some implementations of the present disclosure identifies a set of events at the devices, where the identified set of events are temporally related to the given authentication event. Features can be extracted from the given authentication event and the set of events, by aggregating event data of the events. A classifier that is trained based on labeled data that includes the features can then be applied on the extracted features for determining whether the given authentication event is an unauthorized authentication event.

FIG. 1 shows an example where device 1 is coupled over a network 102 to device 2. The network 102 can include a wired network, a wireless network, or a combination of wired and wireless networks. Although just two devices as shown in FIG. 1, it is noted that a network arrangement can include more than two devices. Examples of devices include any or some combination of the following: a desktop computer, a notebook computer, a tablet computer, a smartphone, a server computer, a storage system, a communication node, or any other device that is capable of communicating over the network 102.

The devices can be part of an enterprise network, which is accessible by users of an enterprise (e.g., a company, a government agency, an educational organization, etc.). In other examples, the network 102 (or a portion of the network 102) can be a public network, such as the Internet.

A user 104 or a program 106 at device 1 can initiate an authentication event 108 with device 2. For example, the user 104 can type in the user's credential, or the user can use a security device (e.g., a badge, a smartphone, etc.) that stores a credential that can be communicated from the security device to device 1, such as by using a wireless connection (e.g., a Bluetooth link, a Wi-Fi link, a radio frequency identification (RFID) link, etc.). In another example, the user 104 at device 1 can attempt to authenticate a different user to device 2. The program 106, which includes machine-readable instructions, can include an application program, an operating system, and so forth. The program 106 can similarly provide a user's credential to initiate the authentication event 108.

In some examples, a logging system 110 can log event data of the authentication event 108 in a log 112, which can store various attributes off the authentication event 108. Examples of attributes in event data of an authentication event include any or some combination of the following: a timestamp (which indicates the time at which the authentication event 108 occurred), an identifier of an initiating user that initiated the authentication event 108 (the initiating user is already authenticated on the source device, and the initiating user wants to authenticate to the destination device—the initiating user wants to authenticate himself/herself, or authenticate a different user), an identifier of a destination user to be authenticated on a destination device (the destination user can be the same as the initiating user), an identifier of the source device (e.g., device 1), an identifier of a destination device (e.g., device 2), a type of authentication, a success/failure indication of the authentication event, and so forth. The log 112 can store event data of multiple authentication events among various devices that communicate over the network 102.

The log 112 can refer to a data repository (or multiple data repositories) to store event data. The log 112 can be stored on a storage device or a collection of storage devices.

In addition to logging event data of authentication events, the logging system 110 can also store event data of associated events in the log 112. In some examples, an associated event (that is associated with an authentication event) is an event that is temporally related to the authentication event. For example, the given authentication event can have a given timestamp specifying when the given authentication event occurred. An event is associated with the authentication event if the event occurred at a source device or a destination device and has a timestamp that is within a time window that includes the timestamp of the given authentication event. The associated events can include events of a different type from authentication events. The combination of an authentication event and associated events can be referred to as a context of the authentication event. Further information regarding associated events is provided below.

FIG. 1 also shows a lateral movement detection system 114 that is connected to the network 102. The lateral movement detection system 114 is able to access the log 112 over the network 102 to determine whether any given authentication event is an unauthorized authentication event. The lateral movement detection system 114 includes a lateral movement detection engine 116 and a classifier 118 that can be applied on features extracted from a context of an authentication event, where the context includes the authentication event and associated events (that are temporally related to the authentication event) to determine whether the authentication event is an unauthorized authentication event.

As used here, an "engine" can refer to a hardware processing circuit, which can include any or some combination of the following: a microprocessor, a core of a multi-core microprocessor, a microcontroller, a programmable gate array, a programmable integrated circuit device, or any other hardware processing circuit.

The classifier 118 that can be trained by the lateral movement detection system 114 and can be applied on features extracted from a context of a given authentication event to determine whether the given authentication event is an unauthorized authentication event. Although just one classifier 118 is shown in FIG. 1, it is noted that the lateral movement detection system 114 can use multiple classifiers (as part of an ensemble of classifiers) for application on features extracted from a context of an authentication event.

The lateral movement detection engine 116 also includes a feature extractor 117 that can be used to extract features from the context of an authentication event. As explained further below, the extracting of features from the context of the authentication event includes aggregating event data of the events that are part of the context. Aggregating event data involves calculating a metric based on event data of multiple events in the context. For example, the metric that can be computed can include a count, which is incremented in response to each occurrence of a specified event or an attribute of a specified event. In other examples, the metric that is computed can include a statistical measure that is derived from attributes of multiple events. In further examples, the metric that is computed can include a sum, a product, or any other type of metric.

If a lateral movement is detected, the lateral movement detection engine 116 can output a lateral movement indication 120 over the network 102 to an action system 122, which includes a lateral movement action engine 124. The lateral movement action engine 124 can take action to address the detected lateral movement, in response to the lateral movement indication 120. For example, the lateral movement action engine 124 can establish a communication with device 1, device 2, or both devices 1 and 2, to cause the device(s) to halt or stop any further activity. As more specific examples, the lateral movement action engine 124 can shut down processes at device 1 and/or device 2 to prevent unauthorized access of information or resources at device 1 and/or device 2. In other examples, the lateral movement action engine 124 can take other actions, including sending a notification of the detected lateral movement to an administrator or other user, or triggering other security responses to the detected lateral movement.

By using a classifier 118 that is trained, the detection of lateral movement is based on the intuition that network and device activities during a normal authentication event differs from network and device activities from an unauthorized authentication event. Such network and device activities can include the following. A new process can be started on the source device (e.g., device 1) or the destination device (e.g., device 2). A process can refer to any activity or machine-readable instructions (such as a thread or a program) that can be started at a device. Another network or device activity can include a Domain Name System (DNS) lookup, in which a device issues a DNS query to determine a network address (e.g., an Internet Protocol (IP) address) assigned to a domain name of the device. For example, the source device can issue a DNS lookup to the destination device or another device. Alternatively, the destination device can issue a DNS lookup to the source device or another device.

Another network or device activity is a Hypertext Transfer Protocol (HTTP) request issued by a device. An HTTP request can be issued by a device to obtain information of another device. Thus, for example, the source device can issue an HTTP request to the destination device, or alternatively, the source device or destination device can issue an HTTP request to a different device.

Another network or device activity includes a transfer of data between devices, such as between the source and destination devices, or between a source or destination device and a different device. A further network or device activity is a security event, where a security event can be any event that triggers a security action at the device. For example, the device may include a malware detector that detects suspicious activities at the device caused by a virus or other malware, which can trigger the malware detector to issue a security alert or to take other action, such as to quarantine a process or to stop a process. Examples of other security events include an alert issued by an intrusion detection system (which has detected intrusion into a device or network), a firewall alert issued by a firewall, and so forth.

Although the starting of processes, DNS lookups, HTTP requests, transfer of data, and/or security events may occur during either a benign authentication event or an unauthorized authentication event, such activities can differ for the benign authentication event and the unauthorized authentication event. For example, many more processes or a previously unseen process can be started on the source or destination device may be associated with an unauthorized authentication event, and/or a larger number of DNS lookups or HTTP requests can be associated with an unauthorized authentication event. Moreover, an unauthorized authentication event can also be associated with transfer of an unusually large amount of data.

The classifier 118 can be trained to detect such activities associated with unauthorized authentication events. Using information of a context of an authentication event, the classifier 118 can determine, based on the features extracted from the context, whether the authentication event is authorized or non-authorized.

As further shown in FIG. 1, features extracted by the feature extractor 117 can be provided to a training data set builder 126, which can include a hardware processing circuit or a combination of a hardware processing circuit and machine-readable instructions, to build a training data set 128. The training data set 128 is provided to a classifier training engine 130, which can train the classifier 118.

The training data set 128 includes collections of features. Each collection of features can be in the form of a feature vector, for example. Each feature vector in the training data set 128 is associated with a classification label, which can be assigned by a user or another classifier. A positive classification label indicates that the respective feature vector is associated with a positive classification for an unauthorized authentication event, while a negative classification label indicates that the respective feature vector is associated with a negative classification for an unauthorized authentication event. As part of training the classifier 118, the classifier training engine 130 provides feature vectors and their corresponding classification labels (of the training data set 128) to the classifier 118, so that the classifier 118 is able to learn how to classify data.

The lateral movement detection engine 116 further includes a filter 119 that can be used to filter authentication events. As noted above, a large system can include a large number of authentication events, many of which are benign authentication events (i.e., authentication events that are performed by authorized entities). The filter 119 filters authentication events to identify authentication events that match a specified pattern. Any authentication events that do not match the specified pattern can be removed. The remaining subset of authentication events are those that match the specified pattern, and this subset of authentication events are authentication events may include unauthorized authentication events, based on classification applied by the classifier 118.

For example, an authentication event having the following pattern (a specified string) can potentially be unauthorized: . . . /Network/Logon/Success. The foregoing string indicates that the logon attempt is performed over a network, and that the logon was successfully completed. Logon attempts over a network if performed by authorized entities are considered authorized authentication events. However, logon attempts over a network if performed by unauthorized entities are considered unauthorized authentication events associated with lateral movement.

Other authentication events not having the foregoing pattern can be treated as benign authentication events. For example, a local authentication event is performed entirely within a device, and thus would not include the "Network" substring.

In other examples, filtering can be based on other criteria.

Figure 2:
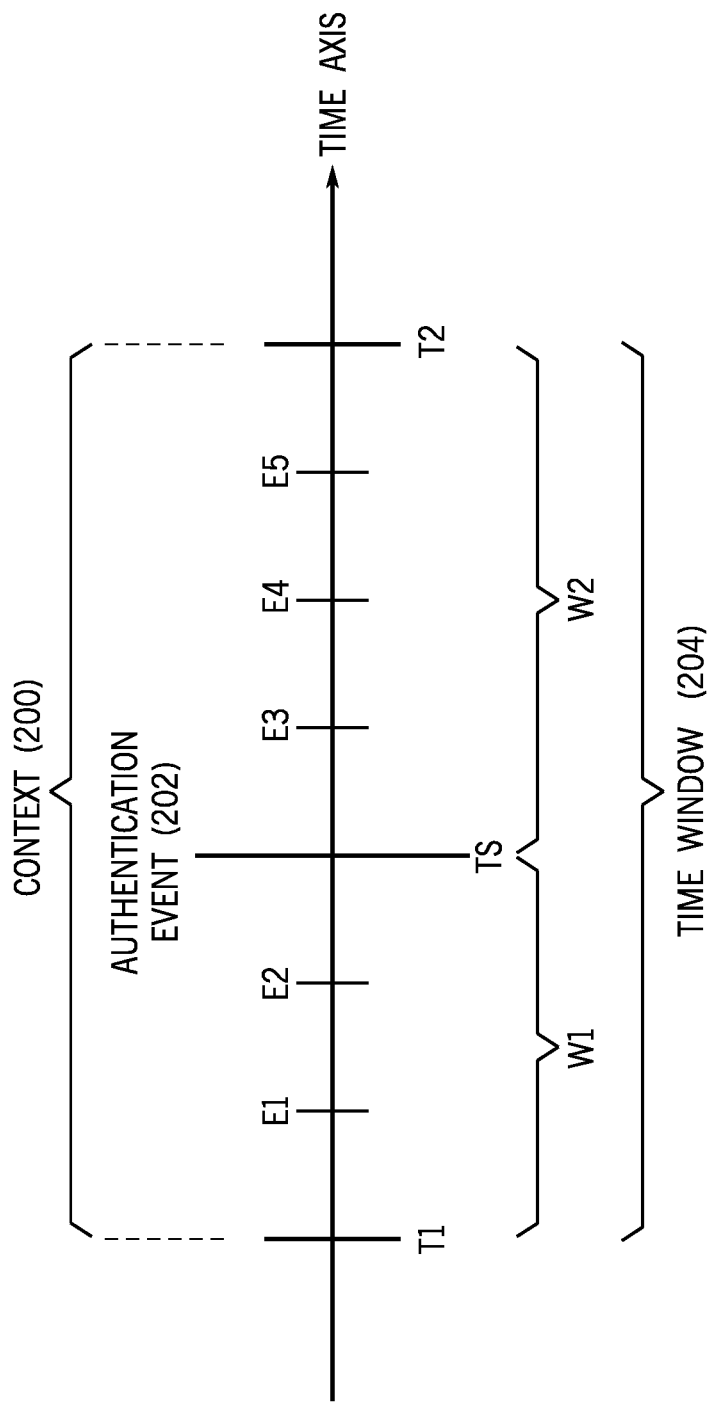
FIG. 2 shows an example context of an authentication event derived according to some examples.

FIG. 2 shows an example of how a context 200 for an authentication event 202 is determined. The authentication event 202 occurred at time TS, as represented by the timestamp of the event data representing the authentication event 202. A time window 204 is defined with respect to the time TS of the authentication event 202. The time window 204 includes the time TS of the authentication event 202. In examples according to FIG. 2, the time window 204 also includes a time interval W1 before the time TS, and a time interval W2 after the time TS. In some examples, W1 is equal to W2. In other examples, W1 is different from W2.

The time window 204 of FIG. 2 starts at time T1 (=TS−W1), and ends at time T2 (=TS+W2). Within the time window 204, various events E1 and E2 can occur at the source device (e.g., device 1 in FIG. 1) in the time interval W1 before the time TS of the authentication event 202, and various events E3, E4, and E5 can occur at the destination device (e.g., device 2 in FIG. 1) in the time interval W2 after the time TS.

The various events E1, E2, E3, E4, and E5 can include events corresponding to any of the activities noted above, such as starting a new process, performing a DNS lookup, performing an HTTP request, transferring data, a security event, or any other event.

Event data associated with the events E1, E2, E3, E4, and E5 is logged by the logging system 110 (FIG. 1) into the log 112 along with the event data of the authentication event 202.

In some examples, the values of W1 and W2 can be preset, such as by an administrator or other user. In further examples, the values of W1 and W2 can be learnt by the lateral movement detection engine 116 based on an analysis of past data and based on feedback provided regarding classifications of authentication events by the classifier 118. For example, a user can indicate that a classification made by the classifier 118 is correct or incorrect, and the classifier 118 can use this feedback to update itself.

Examples of features that can be extracted from a context of an authentication event can include any or some combination of the following: a number (or count) of authentication events at the source device, a number of failed authentication events at the source device in the time window (e.g., 204 in FIG. 2) of the authentication event, a number of authentication events at the destination device in the time window, a number of failed authentication events at the source device in the time window, a number of failed authentication events at the destination device in the time window, a measure associated with processes that were started at the source device and at the destination device in the time window, a number of DNS events at the source device in the time window, a number of DNS events at the destination device in the time window, a number of connections from the source device in the time window, an amount of bytes communicated by the source device in the time window, a total number of packets communicated by the source device in the time window, a number of connections for the destination device in the time window, an amount of data communicated by the destination device in the time window, a total number of packets communicated by the destination device in the time window, and so forth.

The following is a table that lists specific example features that can be extracted from event data of a context. Although a specific list of features is provided, it is noted that in other examples, alternative or additional features can be extracted. In the table below, an "AUTH" activity indicates that the feature is associated with authentication events, a "PROCESS" activity indicates that the feature is associated with process events, a "DNS" activity indicates that the feature is associated with DNS events, and a "DATA FLOW" activity indicates that the features is associated with data flow events.

| FEATURE NAME | ACTIVITY | DESCRIPTION |
| --- | --- | --- |
| src_success | AUTH | Number (or count) of authentication events happening at the source device in the time period [TS − W1, TS] |
| src_failure | | Number of failed authentication events at the source device in the time period [TS − W1, TS] |
| dst_success | | Number of authentication events happening at the destination device in the time period [TS, TS + W2] |
| dst_failure | | Number of failed authentication events at the destination device in the time period [TS, TS + W2] |
| src_process_tfidf | PROCESS | For the source device, TF/IDF (term frequency-inverse document frequency) scores for a set of relevant processes that were started in [TS − W1, TS]. The TD/IDF is a statistical measure that is used to reflect how important a specific process is in a collection of processes that may be executed. In other examples, other statistical measures can be computed. |
| dst_process_tfidf | | For the destination device, TF/IDF scores for a set of relevant processes that were started [TS, TS + W2] |
| src_dns | DNS | Number of DNS events the source device appears in [TS − W1, TS] |
| dst_dns | | Number of DNS events the destination device appears in [TS, TS + W2] |
| src_num_ICMP | DATA FLOW | For the source device, number of connections for ICMP in [TS − W1, TS] |
| src_num_UDP | | For the source device, number of connections for UDP in [TS − W1, TS] |
| src_num_TCP | | For the source device, number of connections for TCP in [TS − W1, TS] |

-continued

| FEATURE NAME | ACTIVITY | DESCRIPTION |
| --- | --- | --- |
| src_num_IPv6 | | For the source device, number of connections for IPv6 in [TS – W1, TS] |
| src_num_standard_port | | For the source device, number of standard ports in [TS – W1, TS] |
| src_num_nonstandard_port | | For the source device, number of non-standard ports in [TS – W1, TS] |
| src_bytes_standard_port | | For the source device, total number of bytes on standard ports in [TS – W1, TS] |
| src_bytes_nonstandard_port | | For the source device, total number of bytes on non-standard ports in [TS – W1, TS] |
| src_packets_standard_port | | For the source device, total number of packets on standard ports in [TS – W1, TS] |
| src_packets_nonstandard_port | | For the source device, total number of packets on non-standard ports in [TS – W1, TS] |
| dst_num_ICMP | | For the destination device, number of connections for ICMP in [TS, TS + W2] |
| dst_num_UDP | | For the destination device, number of connections for UDP in [TS, TS + W2] |
| dst_num_TCP | | For the destination device, number of connections for TCP in [TS, TS + W2] |
| dst_num_IPv6 | | For the destination device, number of connections for IPv6 in [TS, TS + W2] |
| dst_num_standard_port | | For the destination device, number of standard ports in [TS, TS + W2] |
| dst_num_nonstandard_port | | For the destination device, number of non-standard ports in [TS, TS + W2] |
| dst_bytes_standard_port | | For the destination device, total number of bytes on standard ports in [TS, TS + W2] |
| dst_bytes_nonstandard_port | | For the destination device, total number of bytes on non-standard ports in [TS, TS + W2] |
| dst_packets_standard_port | | For the destination device, total number of packets on standard ports in [TS, TS + W2] |
| dst_packets_nonstandard_port | | For the destination device, total number of packets on non-standard ports in [TS, TS + W2] |

In the foregoing list of features, a number of events, such as a number of authentication events, the total number of bytes, the number of connections, the total number of packets, and the TD/IDF score are examples of features that are derived by aggregating event data of corresponding events.

Figure 3:
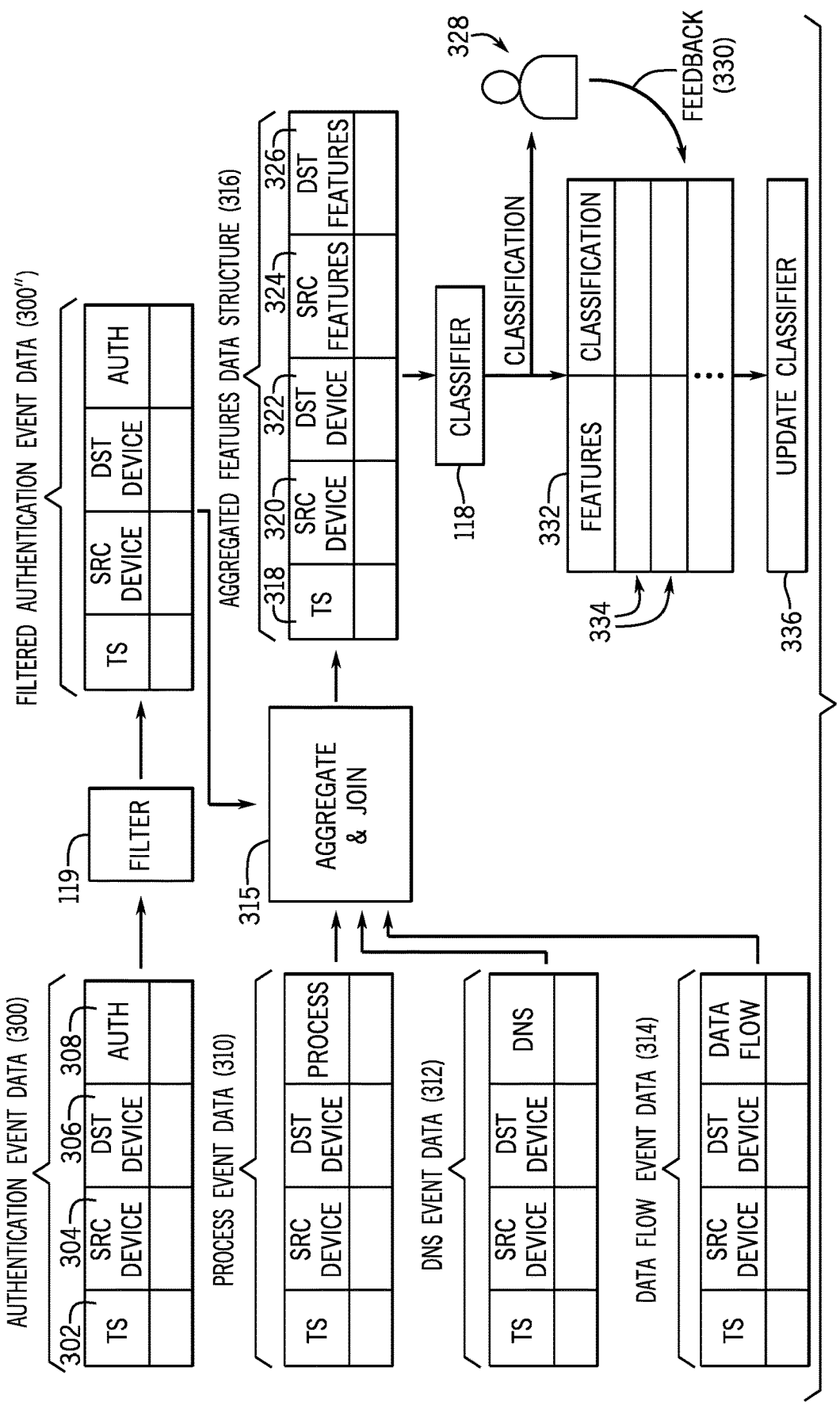
FIG. 3 illustrates aggregating authentication and associated events, according to some examples.

FIG. 3 illustrates an example of feature extraction according to some implementations of the present disclosure. Authentication event data 300 that represents an authentication event includes a timestamp 302, an identifier 304 of a source device, an identifier 306 of a destination device, and attributes 308 of the authentication event, such as an identifier of a user that initiated the authentication event, an identifier of a destination user with which the authenticating user wishes to communicate, a type of authentication, a success/failure indication of the authentication event, and so forth.

Although reference is made to the authentication event data 300 of one authentication event, it is noted that authentication event data of multiple authentication events can be received.

The authentication event data 300 is applied through the filter 119. If the authentication event data satisfies a specified filtering criterion (such as the specified pattern discussed further above), then the authentication event data 300 passes through the filter 119 to produce a filtered authentication event data 300'. Authentication event data that does not satisfy the specified filtering criterion, then the authentication event data does not pass through the filter 119.

FIG. 3 further shows a process event data 310 that represents a process event (e.g., invoking of a process), a DNS event data 312 that represents a DNS event (e.g., a DNS lookup), and a data flow event data 314 that represents a data flow. Note that in further examples, process event data of multiple process events, DNS event data of multiple DNS events, and data flow event data of multiple data flows can be received.

The event data 300, 310, 312, and 314 represent events that are temporarily related to the filtered authentication event represented by the filtered authentication event data 300'.

In some examples, at every update time interval, events (including authentication events, process events, DNS events, and data flow events) can be filtered, aggregated and joined. More specifically, authentication events within the update time interval are filtered by the filter 119, and any authentication events that pass through the filter 119 are aggregated and joined (at 315) to form an aggregated features data structure 316. The aggregation of the event data of the filtered authentication events and associated events extracts features, such as those discussed further above. The extracted features are joined into the aggregated features data structure 316.

For example, if the update time interval is S minutes, where S is a positive integer, the aggregating and joining can be performed every S minutes.

The aggregated features data structure 316 includes a timestamp 318 (which is the timestamp of the filtered authentication event 300'), an identifier 320 of a source device, an identifier 322 of a destination device, source features 324 (features extracted from event data of events at the source device in a time interval prior to the timestamp of an authentication event), and destination features 326 (features extracted from event data of events at the destination device in a time interval after the timestamp of an authentication event).

At each update time interval (e.g., every S minutes), a corresponding aggregated features data structure 316 can be produced.

The classifier 118 uses features of the aggregated features data structure 316 to determine whether each filtered authentication event is an authorized or unauthorized authentication event.

The classification provided by the classifier 118 for each filtered authentication event can be provided to a user 328 or other entity. The user 328 or other entity can provide feedback 330 regarding whether or not a classification made by the classifier 118 with respect to a filtered authentication event is correct. In some examples, a data structure 332 that is used for updating the classifier 118 can be produced, where the data structure 332 includes multiple entries 334, each entry 334 including a collection of features (e.g., a feature vector) and the corresponding classification made by the classifier 118 (i.e., positive classification or negative classification with respect to a respective authentication event being an unauthorized authentication event). The feedback 330 provided by the user 328 or other entity can indicate whether or not the classification made with respect to each respective collection of features is accurate. Using the feedback 330 and the data structure 332, the classifier 118 can be updated (at 336).

The authentication event data 300, the process event data 310, the DNS event data 312, and the data flow event data 314 are part of event data representing a stream of events that are continually processed for application by the classifier 118, and to also update the classifier 118. In this way, the detection of lateral movement and the updating of the classifier 118 (or of multiple classifiers) can be performed in an online manner as a network is operating, to provide timely indications of unauthorized authentication events.

Figure 4:
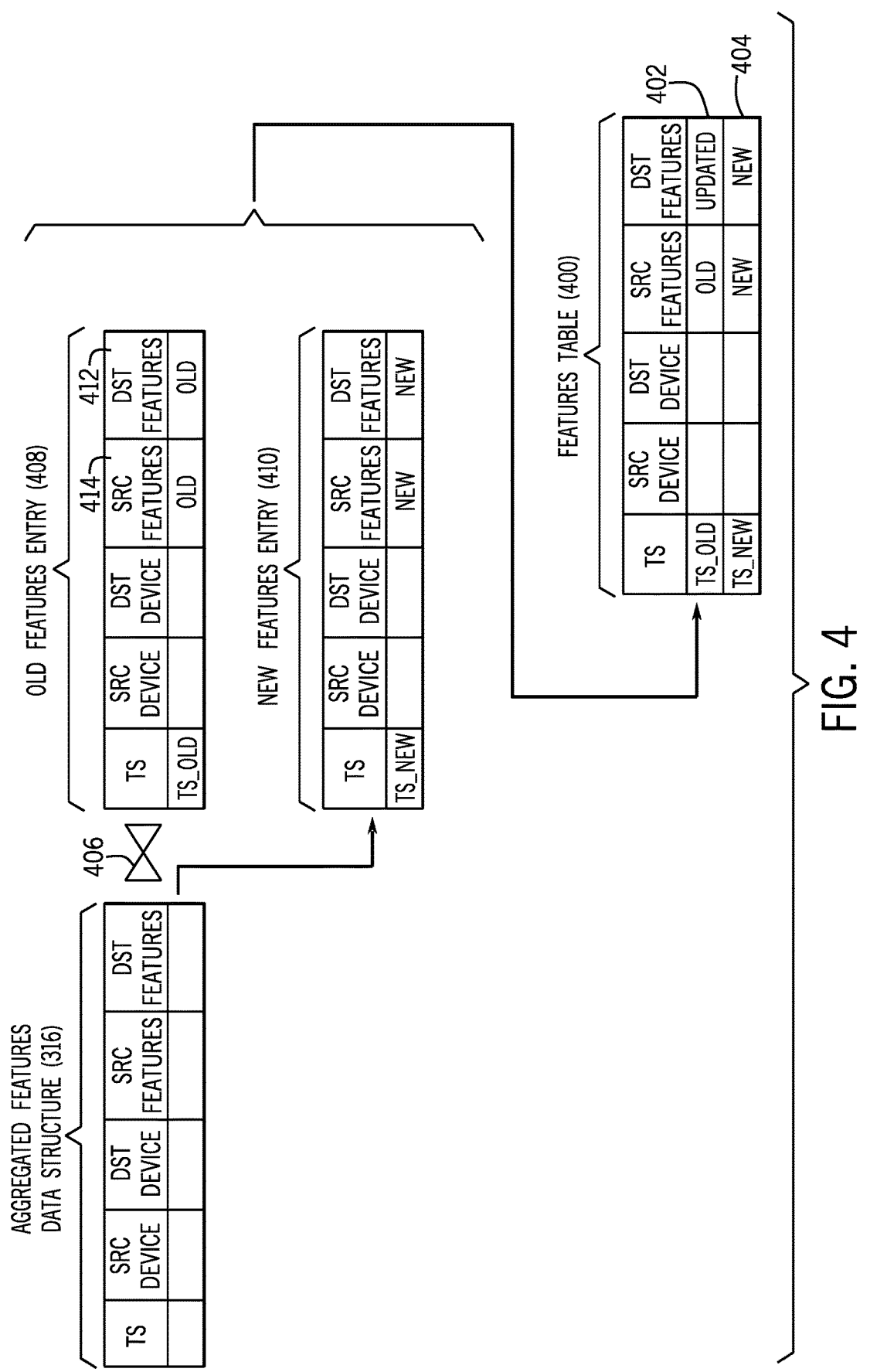
FIG. 4 illustrates producing a features table, according to some examples.

FIG. 4 illustrates an example of producing a features data structure (e.g., a features table) 400 that includes an entry 402 for a prior timestamp (TS_OLD) and an entry 404 for a newer timestamp (TS_NEW).

In FIG. 4, the aggregated features data structure 316 for a given update interval (e.g., a given S minute interval) produced according to FIG. 3 is received. In a current version of the features table 400, an entry exists for the timestamp TS_OLD. This entry is referred to as an old features entry 408 that has a timestamp of TS_OLD, an identifier of a source device, an identifier of a destination device, "old" source features 414, and "old" destination features 412 (where the "old" source and destination features are those that were extracted for event data for an authentication event at timestamp TS_OLD.

A new features entry 410 (having the timestamp TS_NEW) is produced from the aggregated features data structure 316. The aggregated features data structure 316 is joined with the old features entry 408; this joining updates the destination features 412 but does not update the source features 414, according to some examples. As a result, in the features table 400, the old features entry 402 includes the "old" source features of the old features entry 408, but updated destination features derived from the destination features of the aggregated features data structure 316. For example, the destination features of the old features entry 402 in the features table 400 can be based on aggregating the destination features 412 of the old features entry 408 and the destination features of the aggregated features data structure 316.

The new features entry 410 is also added as the new features entry 404 to the features table 400.

Figure 5:
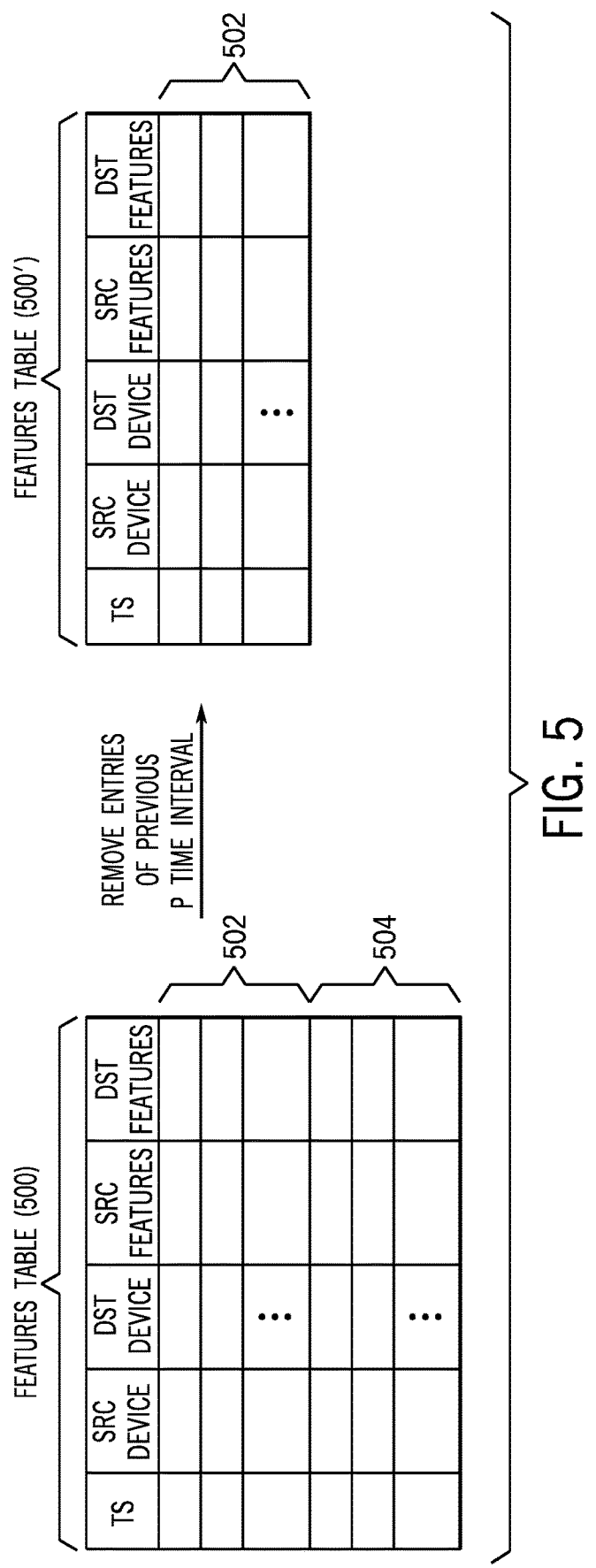
FIG. 5 illustrates removing entries of a features table, according to further examples.

The features table 400 is updated every S minutes (or more generally, every update time interval) with newly received respective aggregated features data structures 316. As a result, the number of entries in the features table 400 can increase such that there are entries corresponding to timestamps within a 2P time window, as shown in FIG. 5. P represents a classifier update time interval; i.e., the classifier 118 is updated every P time interval (such as at 326 in FIG. 3).

As shown in FIG. 5, the features table 500 includes entries 502 that belong in a previous P time interval, while entries 504 are in a latest P time interval. In examples where the classifier 118 is updated every P time interval, the entries of the previous P time interval can be removed from the features table 500 to produce a new features table 500' that can be used with the updated classifier 118.

Figure 6:
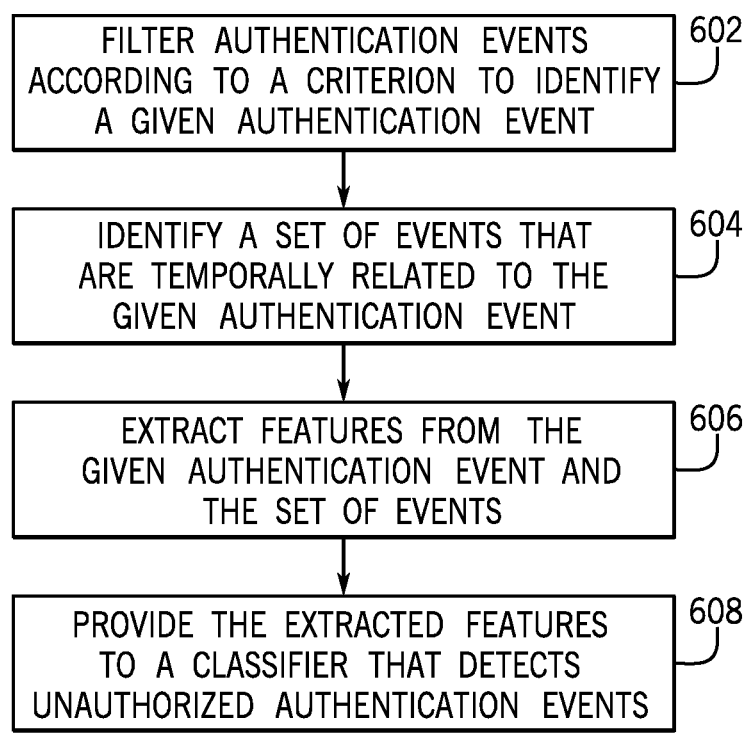
FIG. 6 is a flow diagram of a process according to some examples.

FIG. 6 is a flow diagram of a process according to some implementations of the present disclosure, which can be performed by the lateral movement detection system 114, for example. The process includes filtering (at 602) authentication events according to a criterion to identify a given authentication event, the filtering reducing an amount of authentication events considered by the system for detecting unauthorized authentication events. The process identifies (at 604) a set of events that are temporally related to the given authentication event. The process extracts (at 606) features from the given authentication event and the set of events by aggregating event data of the given authentication event and the set of events. The process provides (at 608) the extracted features to a classifier that detects unauthorized authentication events.

Figure 7:
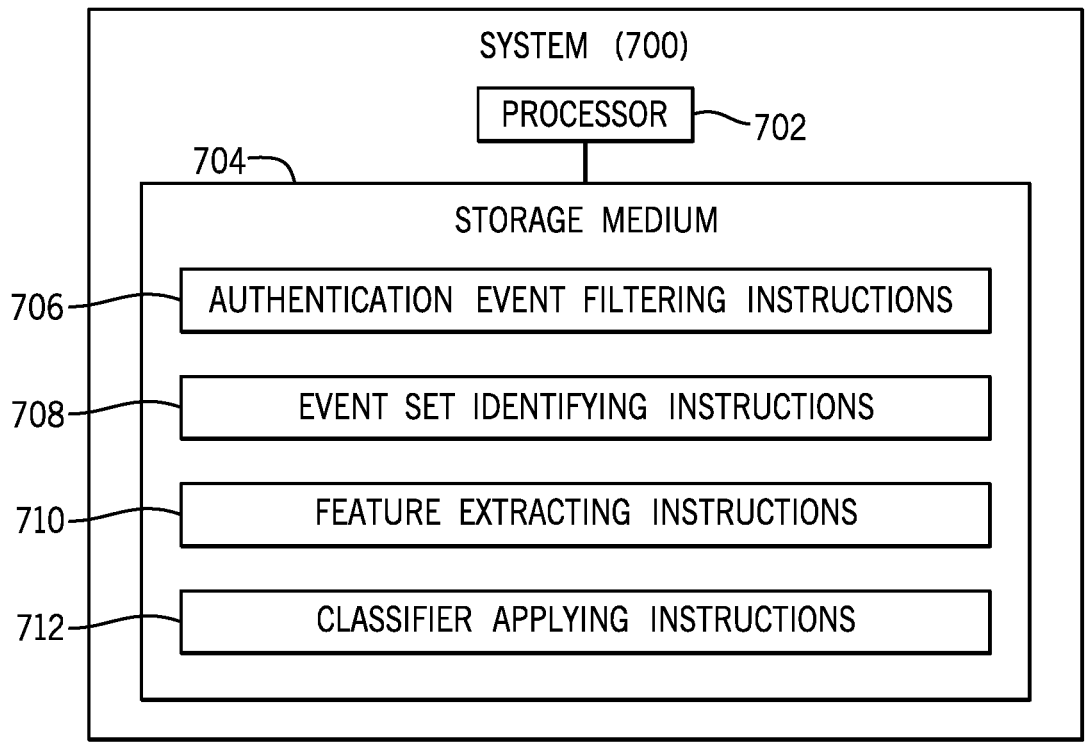
FIG. 7 is a block diagram of a system according to further examples.

FIG. 7 is a block diagram of a system 700 that that includes a processor (or multiple processors) 702. The system 700 further includes a non-transitory machine-readable or computer-readable storage medium 704 storing machine-readable instructions that are executable on the processor 702 to perform various tasks. Machine-readable instructions executable on a processor to perform a task can refer to machine-readable instructions executable on a single processor or on multiple processors to perform the task. A processor can include a microprocessor, a core of a multi-core microprocessor, a microcontroller, a programmable integrated circuit, a programmable gate array, or another hardware processing circuit.

The machine-readable instructions include authentication event filtering instructions 706 to filter authentication events according to a criterion to identify a given authentication event. The machine-readable instructions further include event set identifying instructions 708 to identify a set of events that are temporally related to the given authentication event. The machine-readable instructions further include feature extracting instructions 710 to extract features from the given authentication event and the set of events. The machine-readable instructions further include classifier applying instructions 712 to apply a classifier on the extracted features to determine whether the given authentication event is unauthorized.

Figure 8:
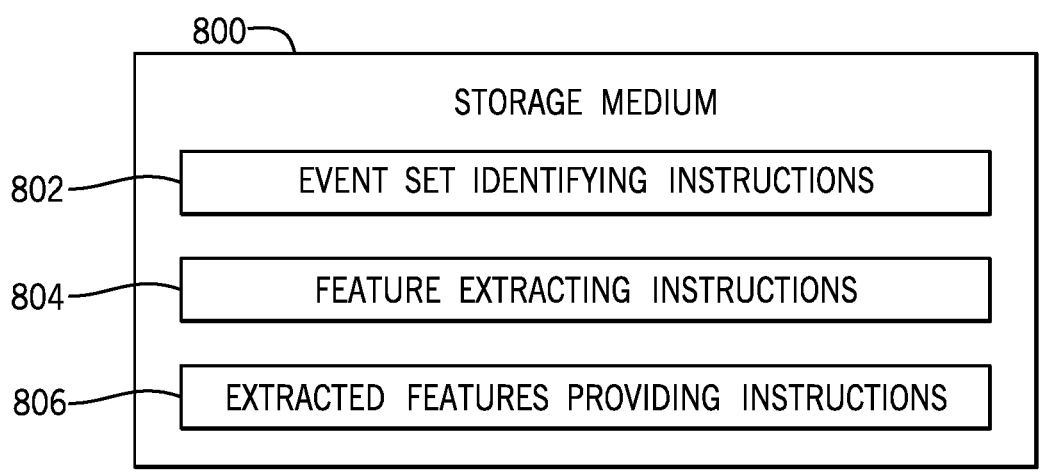
FIG. 8 is a block diagram of a storage medium storing machine-readable instructions according to additional examples.

FIG. 8 is a block diagram of a non-transitory machine-readable or computer-readable storage medium 800 storing machine-readable instructions that upon execution cause a system to perform various tasks. The machine-readable instructions include event set identifying instructions 802 to, for a given authentication event between a plurality of devices in a network, identify a set of events, at the devices, that are temporally related to the given authentication event. The machine-readable instructions further include feature extracting instructions 804 to extract features from the set of events by aggregating event data of the set of events. The machine-readable instructions further include extracted features providing instruction 806 to provide the extracted features to a classifier that detects unauthorized authentication events.

A processor can include a microprocessor, a core of a multi-core microprocessor, a microcontroller, a programmable integrated circuit, a programmable gate array, or another hardware processing circuit.

The storage medium 704 (FIG. 7) or 800 (FIG. 8) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
receive a first time parameter value and a second time parameter value;
for a given authentication event at a first time between a plurality of devices in a network, identify a set of events, of the plurality of devices, that are temporally related to the given authentication event, wherein the set of events comprises events of a different type from the given authentication event, and wherein the plurality of devices include a first device at which a user or program initiated the given authentication event with a second device, and the identifying of the set of events comprises:
defining a first time interval that starts at a time that is the first time less the first time parameter value, and ends at the first time;
defining a second time interval that starts at the first time, and ends at a time that is the first time plus the second time parameter value;
identifying events of the first device in the first time interval before the first time, and
identifying events of the second device in the second time interval following the first time;
extract features from the set of events by aggregating event data of the set of events, wherein the aggregating of the event data comprises computing a metric based on the event data; and
provide the extracted features to a classifier that detects unauthorized authentication events.

2. The non-transitory machine-readable storage medium of claim 1, wherein the instructions upon execution cause the system to:
apply the classifier on the extracted features to determine whether the given authentication event is unauthorized.

3. The non-transitory machine-readable storage medium of claim 1, wherein the instructions upon execution cause the system to:
train the classifier using the extracted features and feedback regarding classifications made by the classifier.

4. The non-transitory machine-readable storage medium of claim 1, wherein the identifying of the set of events comprises identifying events within a time window that includes the first time, the first time interval, and the second time interval.

5. The non-transitory machine-readable storage medium of claim 1, wherein the extracting of the features further comprises extracting features from the given authentication event.

6. The non-transitory machine-readable storage medium of claim 1, wherein the set of events comprises at least one event selected from among: starting a new process at a device, performing a domain name system (DNS) lookup between devices, a transfer of data between devices, a security event on a device, and a Hypertext Transfer Protocol (HTTP) request event.

7. The non-transitory machine-readable storage medium of claim 1, wherein the instructions upon execution cause the system to identify the given authentication event by filtering a plurality of authentication events based on checking for a pattern in the plurality of authentication events.

8. The non-transitory machine-readable storage medium of claim 7, wherein the pattern comprises information indicating a logon access over the network.

9. The non-transitory machine-readable storage medium of claim 1, wherein the aggregating of the event data comprises aggregating event data of events every update time period.

10. The non-transitory machine-readable storage medium of claim 1, wherein the aggregating of the event data further aggregates event data of the given authentication event.

11. The non-transitory machine-readable storage medium of claim 1, wherein the aggregating of the event data comprises calculating at least one selected from among: a count of events, an amount of data of events, a number of packets of events, and a statistical measure computed for events.

12. The non-transitory machine-readable storage medium of claim 1, wherein the set of events is part of a stream of events that are continually processed for application by the classifier and to update the classifier.

13. The non-transitory machine-readable storage medium of claim 1, wherein the computing of the metric comprises computing a statistical measure based on the event data.

14. The non-transitory machine-readable storage medium of claim 1, wherein the first time parameter value and the second time parameter value are adjustable based on machine learning according to past classifications of the classifier.

15. A system comprising:
a processor; and
a non-transitory storage medium storing instructions executable on the processor to:
receive a first time parameter value and a second time parameter value;
filter authentication events according to a criterion to identify a given authentication event, wherein the filtering of the authentication events comprises checking the authentication events for a specified pattern, and removing an authentication event of the authentication events not matching the specified pattern to produce a subset of authentication events including the given authentication event at a first time;
identify a set of events that are temporally related to the given authentication event, wherein the set of events includes events of a plurality of devices including a first device at which a user or program initiated the given authentication event with a second device, and the identifying of the set of events comprises:
defining a first time interval that starts at a time that is the first time less the first time parameter value, and ends at the first time;
defining a second time interval that starts at the first time, and ends at a time that is the first time plus the second time parameter value;
identifying events of the first device in the first time interval before the first time, and
identifying events of the second device in the second time interval following the first time;
extract features from the given authentication event and the set of events; and
apply a classifier on the extracted features to determine whether the given authentication event is unauthorized.

16. The system of claim 15, wherein the instructions are executable on the processor to:
receive feedback regarding the determination made by the classifier on the extracted features; and
update the classifier based on the feedback.

17. The system of claim 15, wherein the set of events comprises events of a different type from the given authentication event, wherein the extracting of the features from the given authentication event and the set of events comprises aggregating event data of the given authentication event and the set of events, and wherein the aggregating of the event data comprises computing a metric based on the event data.

18. A method comprising: filtering, by a system comprising a processor, authentication events according to a criterion to identify a given authentication event having a first time, the filtering reducing an amount of authentication events considered by the system for detecting unauthorized authentication events;
receiving, by the system, a first time parameter value and a second time parameter value;
identifying, by the system, a set of events that are temporally related to the given authentication event, wherein the set of events includes events of a plurality of devices including a first device at which a user or program initiated the given authentication event with a second device, and the identifying of the set of events comprises:
defining a first time interval that starts at a time that is the first time less the first time parameter value, and ends at the first time;
defining a second time interval that starts at the first time, and ends at a time that is the first time plus the second time parameter value;
identifying events of the first device in the first time interval before the first time, and
identifying events of the second device in the second time interval following the first time;
extracting, by the system, features from the given authentication event and the set of events by aggregating event data of the given authentication event and the set of events; and
providing, by the system, the extracted features to a classifier that detects unauthorized authentication events.

19. The method of claim 18, wherein the set of events comprises events of a different type from the given authentication event, and wherein the aggregating of the event data comprises computing a statistical metric based on the event data.

* * * * *